United States Patent [19]

Folger et al.

[11] Patent Number: 4,879,448

[45] Date of Patent: Nov. 7, 1989

[54] APPARATUS FOR LASER WELDING AND ANNEALING

[75] Inventors: Edward C. Folger, Melbourne; Glenn S. Witerski, Palm Bay, both of Fla.

[73] Assignee: Storage Technology Corporation, Louisville, Colo.

[21] Appl. No.: 261,837

[22] Filed: Oct. 24, 1988

[51] Int. Cl.$^4$ .............................................. B23K 26/00
[52] U.S. Cl. ........................... 219/121.63; 219/121.64; 219/121.78; 219/121.82; 219/121.85
[58] Field of Search ....................... 219/121.63, 121.64, 219/121.65, 121.66, 121.75, 121.78, 121.82, 121.6, 121.85

[56] References Cited

U.S. PATENT DOCUMENTS

| | | | |
|---|---|---|---|
| 4,151,014 | 4/1979 | Charschan et al. | 219/121.66 X |
| 4,315,122 | 3/1982 | Pope et al. | 219/121.63 |
| 4,377,735 | 3/1983 | Minamida et al. | 219/121.6 X |

Primary Examiner—C. L. Albritton
Attorney, Agent, or Firm—Dorr, Carson, Sloan & Peterson

[57] ABSTRACT

Laser welding and annealing is accomplished by using a single laser and a single automated fixture that secures a workpiece at the focal point of a laser beam for welding and removed from the focal point for annealing without requiring alignment and positioning operations for each of the functions performed.

22 Claims, 3 Drawing Sheets

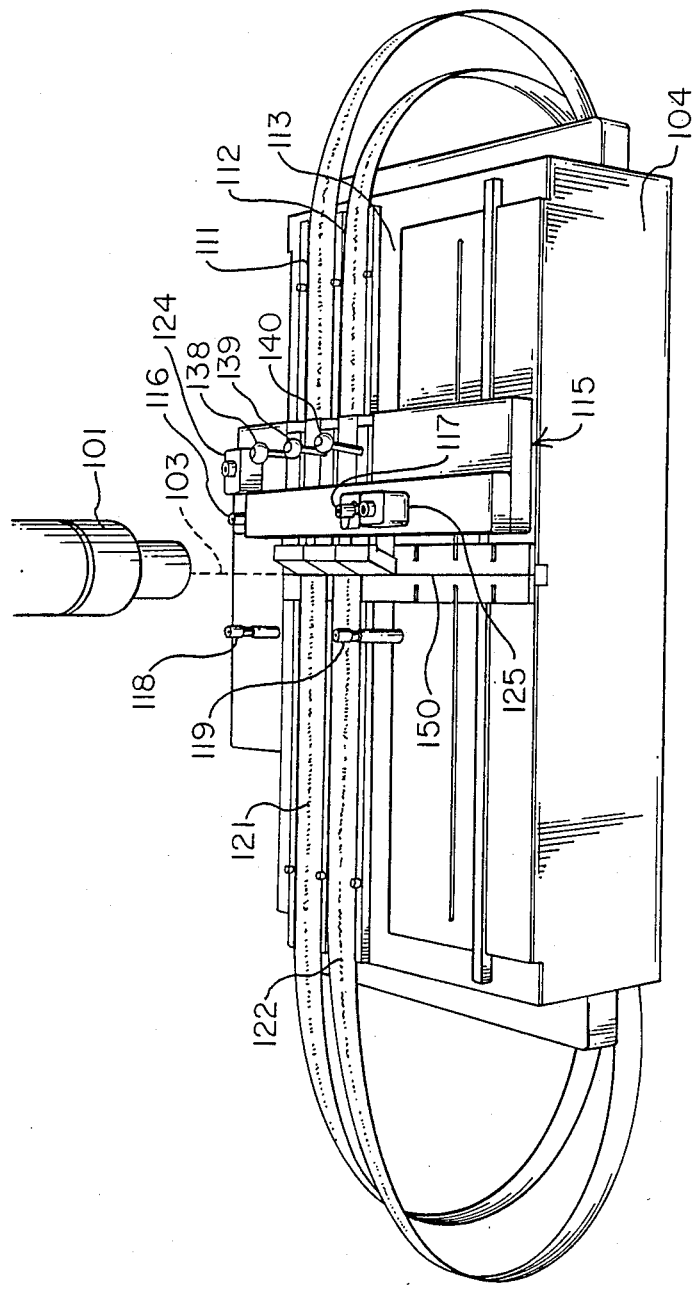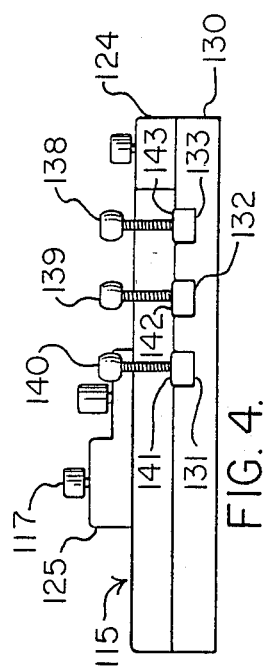

APPARATUS FOR LASER WELDING AND ANNEALING

FIELD OF THE INVENTION

This invention relates to laser welding and annealing of a workpiece and in particular to apparatus that uses a laser to sequentially weld and anneal a workpiece using a single fixture.

PROBLEM

It is a problem in the field of laser welding and annealing to simply and inexpensively perform both the welding and annealing steps using a laser. Lasers have long been used to perform precision welding operations due to the highly focused nature of the laser beam. In operation, a high power laser beam is focused through the use of lenses to a predefined focal point which coincides with the designated site on the workpiece that is to be welded. The focused laser beam heats the designated site on the workpiece. By applying a laser beam of sufficient intensity and for a sufficient duration of time, the designated site on the workpiece can be welded.

Once the welding operation is completed, the welds must be annealed, that is heated to an elevated temperature for a fixed duration of time in order to obtain the desired metallurgical characteristics in the welded area. A laser can be used to perform this annealing operation and requires, as in the laser welding operation, that a laser beam be focused on the site on the workpiece that was welded. The laser is activated for a sufficient length of time to elevate the temperature of the weld to the annealing temperature. The temperature control is obtained by the use of a separate low power laser.

The difficulty with this arrangement is that each of the steps of welding and annealing requires separate lasers and separate fixtures, each of which requires very precise orientation and alignment of the workpiece with the associated laser. This is because the focal point of the laser beam must exactly match the site on the workpiece that is to be welded or annealed. This precision alignment operation is labor intensive and susceptible to error. Therefore, in many laser welding applications, the traditional annealing by heating the entire workpiece is performed in order to minimize the expense involved. However, it may not be desirable t heat the entire workpiece or even an area surrounding the laser welds to such an elevated temperature as part of the annealing process, such as in the case of a printed circuit board.

SOLUTION

The above described problems are solved and a technical advance achieved in the field by the apparatus for laser welding and annealing of this invention which uses a single laser and a single fixture for both the laser welding and annealing operations thereby eliminating the necessity of using two lasers and realigning the workpiece for the annealing operation. This is accomplished by the use of a single automated fixture that secures the workpiece in a predefined location. The fixture orients the designated site on the workpiece to be welded directly in the path of the laser beam and at the focal point of the laser beam in order to provide proper heating of the site for welding. The welding operation is performed in conventional fashion and, upon its completion, the fixture translates the workpiece along the axis of the laser beam a predefined amount so that the site on the workpiece that was welded remains in the path of the laser beam but is no longer at the focal point of the laser beam. The laser is again activated and elevates the temperature of the designated site on the workpiece that was welded to the annealing temperature rather than the welding temperature due to the fact that the laser beam is now out of focus as it impinges on the site on the workpiece that was welded. Thus, by the use of a simple axial repositioning of the workpiece, laser welding and annealing can be accomplished using a single laser and a single fixture and without requiring alignment and positioning operations for each of the functions performed. These and other features and advantages of this invention can be ascertained by reading the following detailed description.

BRIEF DESCRIPTION OF THE DRAWING

FIG. 2 illustrates a top view of the laser welding and annealing apparatus;

FIG. 4 illustrates a detailed perspective view of the laser welding and annealing apparatus workpiece clamp.

DETAILED DESCRIPTION

Lasers have long been used to perform precision welding operations due to the highly focused nature of the laser beam. In operation, the laser beam is focused through the use of focusing objective lenses to a predefined focal point which coincides with the designated site on the workpiece that is to be welded. The focused laser beam heats on the designated site on the workpiece. By applying a laser beam of sufficient intensity and for a sufficient duration of time, the designated site on the workpiece can be welded.

Once the welding operation is completed, the welds must be annealed, that is heated to an elevated temperature for a fixed duration of time in order to obtain the desired metallurgical characteristics in the welded area. A laser can be used to perform this annealing operation and requires, as in the laser welding operation, that a laser beam be focused on the site on the workpiece that was welded. The laser is activated for a sufficient length of time to elevate the temperature of the weld to the annealing temperature.

The apparatus for laser welding and annealing of this invention which uses a single laser and a single fixture for both the laser welding and annealing operations thereby eliminating the necessity of using two lasers and realigning the workpiece for the annealing operation. This is accomplished by the use of a single automated fixture that secures the workpiece in a predefined location. The fixture orients the designated site on the workpiece to be welded directly in the path of the laser beam and at the focal point of the laser beam in order to provide proper heating of the site for welding. The welding operation is performed in conventional fashion and, upon its completion, the fixture translates the workpiece along the axis of the laser beam a predefined amount so that the site on the workpiece that was welded remains in the path of the laser beam but is no longer at the focal point of the laser beam. The laser is again activated and elevates the temperature of the designated site on the workpiece that was welded to the annealing temperature rather than the welding temperature due to the fact that the laser beam is now out of focus as it impinges on the site on the workpiece that was welded. Thus, by the use of a simple axial repositioning of the workpiece, laser welding and annealing can be accomplished using a single laser and a single fixture and without requiring alignment and positioning operations for each of the functions performed.

Figure 1:
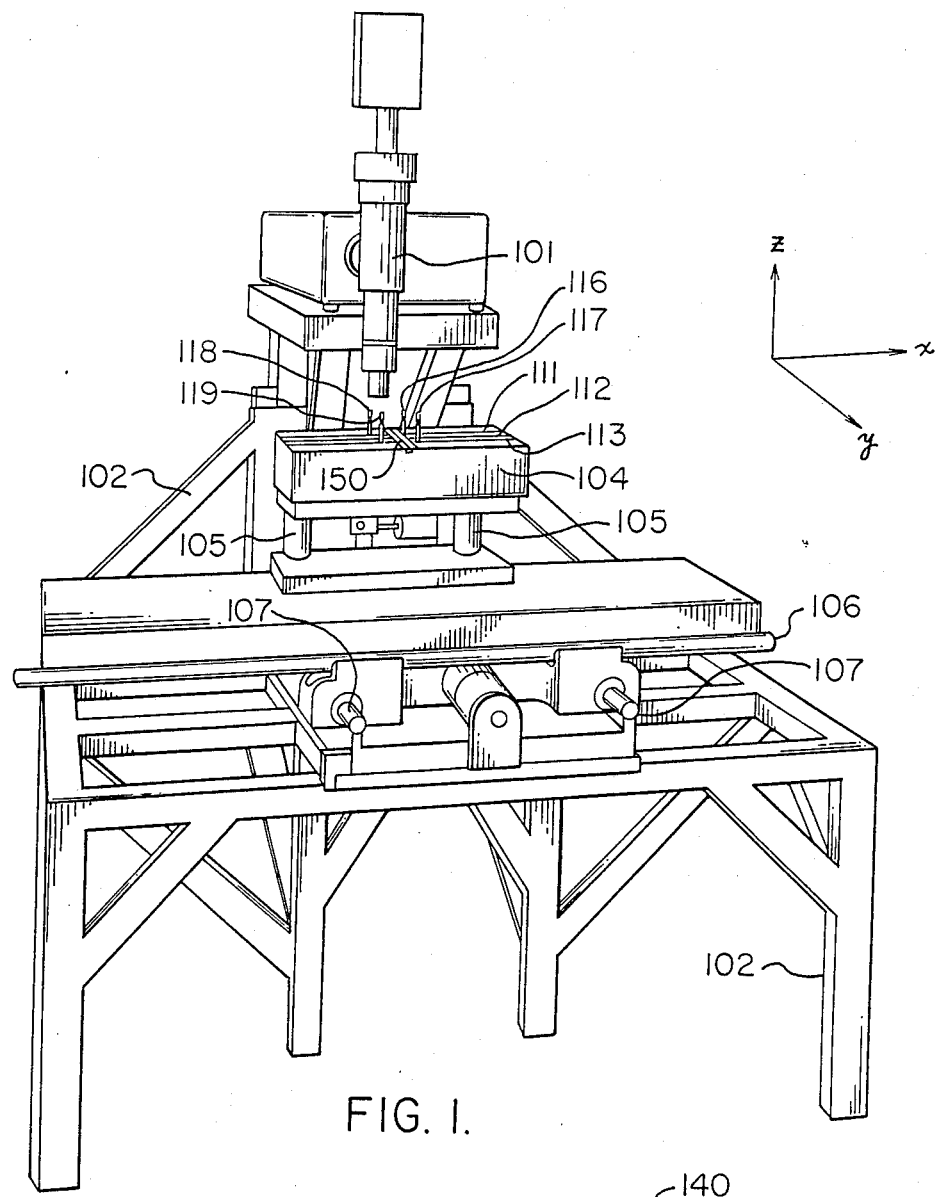
FIG. 1 illustrates a perspective view of the laser welding and annealing apparatus.
Figure 3:
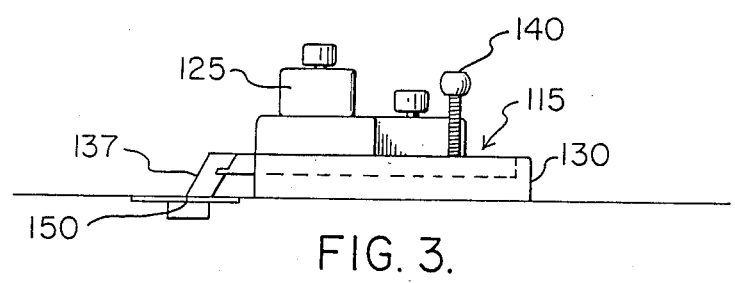
FIG. 3 illustrates a front view of the laser welding and annealing apparatus.
Figure 5:
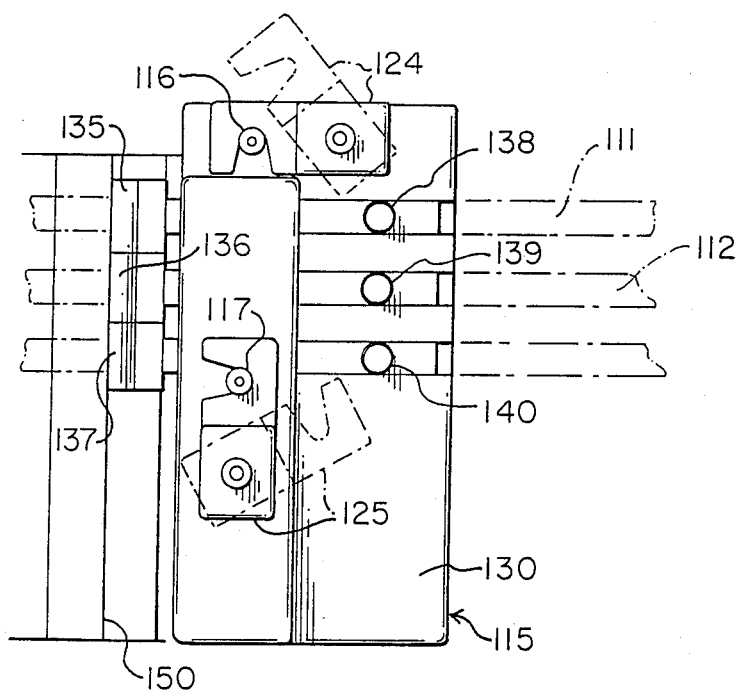
FIG. 5 illustrates a top view of the band clamping apparatus.

FIG. 1 illustrates a perspective view of the apparatus for laser welding and annealing. Laser 101 is rigidly secured to frame 102 in a precise position and orientation. Laser 101 is a pulsed laser that outputs a focused laser beam 103 in the direction illustrated by the arrow labeled A.

Fixture Table

A fixture table 104 is positioned below laser 101 such that top surface of fixture table 104 is oriented in directions that are orthoginal to the axis of laser beam 103. For convenience of description, FIG. 1 illustrates a set of coordinate axes x, y and z. The laser beam 103 is transmitted in the negative z axis direction while the top surface of fixture table 104 lies in the xy plane. Fixture table 104 is connected to frame 102 by means of a number of fixture table positioning elements which are illustrated on FIG. 1 as a z axis positioning rails 105, x axis positioning rails 106 and y axis positioning rails 107. Fixture table 104 is driven along these three sets of rails by corresponding motors (not shown) 108, 109 and 110 in the z, x and y axes respectively. Thus, by activating any combination of these motors 108-110, the position of fixture table 104 and the rectilinear x, y and z axes can be accomplished. Since the positioning apparatus is connected to frame 102 as is laser 101, a precise orientation and positioning between laser 101 and fixture table 104 can be accomplished in well known fashion via positioning rails 105-107 and their associated motors 108-110.

Fixture table 104 has incorporated into the top surface thereof a plurality of indentations 111-113 each of which corresponds in size and shape to the workpiece that is to be welded and annealed using this apparatus. In this exemplary embodiment, printer bands from impact printers are used to illustrate a typical workpiece that would be welded and annealed by this apparatus. In FIG. 1 printer bands 21 and 122 are illustrated placed in corresponding indentations 111, 112 in the top surface of fixture table 104. The printer bands consist of an elongated rectangular-shaped piece of metal on which is etched a series of print characters and associated timing marks. These printer bands must then have the distal ends thereof welded together to form a continuous loop so that they can be installed on an impact printer.

Workpiece Clamps

In order to weld the ends of a printer band such as 121, the laser welding and annealing apparatus is equipped with a pair of clamps 114, 115 that are used to secure the ends of the printer bands 121, 122 to work fixture table 104. Clamps 114 and 115 are mirror images around the y axis and therefore only the details of the construction of clamp 114 are provided to illustrate the construction of a typical clamp. Clamp 114 consists of a base 130 into which a plurality of grooves 131-133 are cut. The number of grooves 131-133 in base 130 correspond in number and position to the number and position of the workpieces to be secured to fixture table 104. Therefore, each one of grooves 131-133 in base 130 of clamp 114 are positioned to be locatable above a corresponding one of indentations 111-113 in the top surface of fixture table 104. A top 134 is affixed to base 130 by means of screws 138, 139. Top 134 includes a plurality of slots 141-143 corresponding in number and location to the grooves 131-133 cut in base 130.

Clamp 114 includes two levers 124, 125 that are used to secure clamp 114 to the top surface of fixture table 104. This is accomplished by the use of pins 116, 117 that protrude from the top of fixture table 104 in the z axis direction. Pins 116, 117 include a necked down portion which is used to interconnect with corresponding levers 124, 125 on clamp 114. In operation, clamp 114 contains corresponding holes cut into base 130 and top 134 to mate with pins 116, 117. Clamp 114 is placed on to corresponding pins 116, 117 so that the tops and necked down portions of pins 116, 117 protrude through top 134 of clamp 114. Levers 124 and 125 are manually activated to engage the necked down portion of pins 116, 117 respectively to secure clamp 114 in a fixed and predetermined x, y and z axis position on the top surface of fixture table 104.

A plurality of clamp arms 135-137 are inserted into corresponding ones of the apertures in clamp 14 formed the combined openings of grooves 131-133 and their corresponding and matching slots 141-143 in base 130 and top 134 respectively of clamp 114. Clamp arms 135-137 are secured in these openings by means of screws 147-149 and the vertical or z axis positioning of these clamp arms 135-137 are effectuated by the use of adjustment screws 138-140. Clamp 115 is similarly secured to fixture table 104 by the use of pins 118, 119 as described above for clamp 114. In order to illustrate the operation of this apparatus, FIG. 1 illustrates the positioning of clamp 114 to thereby enable the underlying indentations 111-113 in fixture table 104 and the structure of pins 118, 119 to be obvious to the reader.

Laser Welding Operation

In operation, a plurality of printer bands 121, 122 are placed in the corresponding indentation 111, 112 in the top surface of fixture table 104. The printer bands are aligned such that one end of each of the printer bands are aligned with the center line 150 of fixture table 104. Center line 150 is the point midway between clamps 114 and 115 into which the site to be welded and annealed is placed. Once printer bands 121 and 122 are placed in their respective indentations 111, 112 and positioned so that the ends of each of the printer bands 121, 122 match the center line 150 of fixture table 104, clamp 114 is placed over pins 116, 117 and levers 124, 125 are operated to secure clamp 114 to a top surface of fixture table 104. Clamp arms 135, 136 of clamp 114 secure printer bands 121, 122 to fixture table 104 in the predetermined position aligned with center line 150. The tension of clamp arms 135, 136 can be adjusted by the use of corresponding adjustment screws 138, 139 in order to controllably apply pressure to the ends of printer bands 121, 122 respectively.

The other ends of printer bands 121, 122 are placed in juxtaposed position with the secured ends of printer bands 121, 122 in indentations 111, 112 on the opposite side of center line 150 from the secured ends of printer bands 121, 122. As seen in FIG. 1, this creates an endless loop of printer band so that when the two distal ends of the printer bands are welded together the printer band forms a continuous loop. Once these free ends of printer bands 121, 122 are placed in their respective indentations 111, 112, clamp 115 is placed over corresponding pins 118, 119 and secured in place by levers 126, 127 to secure these previously free ends of printer bands 121, 122 in place on fixture table 104.

Once the printer bands are secured to fixture table 104 as illustrated in FIG. 1, the laser welding operation is initiated. Laser 101 is a pulsed laser that produces a fixed output consisting of a beam of laser light that is focused on a focal point, which focal point corresponds to the top surface of the workpiece affixed to fixture table 104 along the center line 150 of fixture table 104. The activation of laser 101 produces laser beam 103 which produces a spot of laser light on the top surface of one of printer bands 121, 122 along center line 150 of fixture table 104. The illumination of this site on printer band 121 for example generates a significant amount of heat, elevating the temperature of the ends of the printer band to a temperature sufficient to cause the juxtaposed ends of the printer band to be welded together. The beam of laser light 103 is applied to the printer band for a sufficient duration of time to complete the welding process and y axis positioning motor 110 is activated by a control circuit (not shown) to move fixture table 104 in a negative y axis direction to weld across the narrow dimension of printer band 121 in the y axis direction. In addition, adjacent printer band 122 is welded when motor 110 transposes fixture table 104 in the negative y axis direction along y axis positioning rails 107. On the completion of the welding of printer bands 121, 122 fixture table 104 has been translated solely in the y axis direction. If a workpiece affixed to fixture table 104 required a weld in a curvilinear direction or in a direction other than purely y axis positioning the x and y axis positioning motors 109, 110 could be activated individually or cooperatively to move fixture table 104 in any path along the x and y axis to thereby accomplish a weld of any size and shape on fixture table 104. For simplicity of description, a simple y axis positioning has been described above.

Laser Annealing Operation

Once the welding operation is completed, the weld on printer bands 121, 122 needs to annealed in order to obtain the proper metallurgical characteristics required for a long life and durability of printer bands 121, 122. The annealing process is accomplished by returning fixture table 104 to its initial position in the x and y axes. Positioning motor 108 is then activated to translate fixture table along z axis positioning rails 105 a sufficient distance so that the focal point of the beam of laser light 103 no longer corresponds to the top surface of fixture table 104 or the site on printer bands 121, 122 that was to be welded. The beam of laser light 103 still shines on the site on bands 121 that was welded however the beam of laser light 103 is no longer focused and therefore the heat generated by the beam of laser light 103 is significantly reduced from that generated by the application of the focused beam of laser light 103 on the site on printer band 121 that was welded.

By controlling the z axis positioning of fixture table 104, the temperature as well as the area to be annealed on printer band 121 can be controlled to a high degree of precision. Thus, motor 108 is activated to translate fixture table 104 a predetermined distance along z axis positioning rails 105 so that the beam of laser light 103 shines on the area that was welded on printer band 121 in an unfocused manner. Laser 101 is activated to thereby elevate the temperature of the welded area on printer band 121 to a temperature sufficient to anneal the material. Motor 110 is then activated as previously described to cause fixture table 104 to translate along the y axis position rails 107 to anneal the length of the weld on printer band 121 and then printer band 122. In this fashion, a single fixture is used to both weld and anneal the workpieces secured to fixture table 104. In addition, the laser can be a simple device having continuous power and minimal control circuitry since the power output of the laser is constant but its effect on the workpiece is controlled by simply repositioning fixture table 104 in the z axis direction along the axis of transmission of the beam of laser light 103. By rigidly securing laser 101 to frame 102, precise positioning control can be simply obtained.

While a specific embodiment of this invention has been disclosed, it is expected that those skilled in the art can and will design alternate embodiments of this invention that fall within the scope of the appended claims.

What is claimed:

1. Apparatus for sequentially welding and annealing one or more sites on a workpiece using a beam of laser light transmitted along a fixed axis, which beam of laser light is focused at a predetermined focal point, comprising:
   means for securing said workpiece in the path of said transmitted beam of laser light with a site on said workpiece located at said predetermined focal point of said transmitted beam of laser light to weld said site on said workpiece;
   means for transporting said securing means along said fixed axis of said transmitted beam of laser light a predetermined distance to maintain said site on said workpiece in said path of said transmitted beam of laser light outside said focal point of said transmitted beam of laser light to anneal said site on said workpiece;
   means for translating said securing means in directions normal to said axis of said transmitted beam of laser light for welding and annealing said site on said workpiece when said site on said workpiece is greater in size than said focal point of said transmitted beam of laser light.

2. The apparatus of claim 1 further including:
   means for translating said securing means in directions normal to said axis of said transmitted beam of laser light for welding and annealing a plurality of said sites on said workpiece.

3. The apparatus of claim 1 wherein said securing means includes:
   worktable means for providing a substantially flat surface to support said workpiece;
   means connectable to said worktable for clamping said workpiece to said worktable.

4. The apparatus of claim 3 wherein said worktable includes:
   one or more indentations cut in the surface thereof, facing said transmitted beam of laser light, each of size and shape to match a corresponding workpiece for retaining said corresponding workpiece in a fixed position in directions normal to said axis of said transmitted beam of laser light.

5. Apparatus for sequentially welding and annealing one or more sites on a workpiece comprising:

laser means for transmitting a beam of laser light along a fixed axis, which beam of laser light is focused at a predetermined focal point;

means for securing said workpiece in the path of said transmitted beam of laser light with a site on said workpiece located at said predetermined focal point of said transmitted beam of laser light to weld said site on said workpiece;

means for transporting said securing means along said fixed axis of said transmitted beam of laser light a predetermined distance to maintain said site on said workpiece in said path of said transmitted beam of laser light outside said focal point of said transmitted beam of laser light to anneal said site on said workpiece.

6. The apparatus of claim 5 further including:
frame means for rigidly affixing said laser means in a predetermined position.

7. The apparatus of claim 5 further including:
means for translating said securing means in directions normal to said axis of said transmitted beam of laser light for welding and annealing said site on said workpiece when said site on said workpiece is greater in size than said focal point of said transmitted beam of laser light.

8. The apparatus of claim 5 further including:
means for translating said securing means in directions normal to said axis of said transmitted beam of laser light for welding and annealing a plurality of said sites on said workpiece.

9. The apparatus of claim 5 wherein said securing means includes:
worktable means for providing a substantially flat surface to support said workpiece;
means connectable to said worktable for clamping said workpiece to said worktable.

10. The apparatus of claim 9 wherein said worktable includes:
one or more indentations cut in the surface thereof, facing said transmitted beam of laser light, each of size and shape to match a corresponding workpiece for retaining said corresponding workpiece in a fixed position in directions normal to said axis of said transmitted beam of laser light.

11. The apparatus of claim 5 wherein said laser means comprises a pulsed operation laser.

12. A method of sequentially welding and annealing one or more sites on a workpiece using a beam of laser light transmitted along a fixed axis, which beam of laser light is focused at a predetermined focal point, comprising the steps of:
securing said workpiece in the path of said transmitted beam of laser light with a site on said workpiece located at said predetermined focal point of said transmitted beam of laser light to weld said site of said workpiece;
transporting said workpiece along said fixed axis of said transmitted beam of laser light a predetermined distance to maintain said site on said workpiece in said path of said transmitted beam of laser light outside said focal point of said transmitted beam of laser light to anneal said site on said workpiece; and
translating said workpiece in directions normal to said axis of said transmitted beam of laser light for welding and annealing said site on said workpiece when said site on said workpiece is greater in size than said focal point of said transmitted beam of laser light.

13. The method of claim 12 further including the step of:
translating said workpiece in directions normal to said axis of said transmitted beam of laser light for welding and annealing a plurality of said sites on said workpiece.

14. Apparatus for sequentially welding together and annealing the ends of one or more printer bands comprising:
laser means for transmitting a beam of laser light along a fixed axis, which beam of laser light is focused at a predetermined focal point;
means for securing the ends of one of said printer bands in juxtaposed position together and in the path of said transmitted beam of laser light with said ends of said printer band located at said predetermined focal point of said transmitted beam of laser light to weld said juxtaposed ends of said printer bands together;
means for transporting said securing means along said fixed axis of said transmitted beam of laser light a predetermined distance to maintain said welded ends of said printer band in said path of said transmitted beam of laser light outside said focal point of said transmitted beam of laser light to anneal said welded ends of said printer band.

15. The apparatus of claim 14 further including:
means for translating said securing means in directions normal to said axis of said transmitted beam of laser light for welding and annealing said juxtaposed ends of said printer band when said juxtaposed ends of said printer band is greater in size than said focal point of said transmitted beam of laser light.

16. The apparatus of claim 14 further including:
means for translating said securing means in directions normal to said axis of said transmitted beam of laser light for welding and annealing a plurality of said printer bands concurrently affixed to said securing means.

17. The apparatus of claim 14 wherein said securing means includes:
worktable means for providing a substantially flat surface to support said printer bands;
means connectable to said worktable for clamping said printer bands to said worktable.

18. The apparatus of claim 17 wherein said worktable includes:
one or more indentations cut in the surface thereof, facing said transmitted beam of laser light, each of size and shape to match a corresponding printer band for retaining said corresponding printer band in a fixed position in directions normal to said axis of said transmitted beam of laser light.

19. A method of sequentially welding together and annealing the ends of one or more printer bands comprising the steps of:
transmitting a beam of laser light along a fixed axis, which beam of laser light is focused at a predetermined focal point;
securing the ends of one of said printer bands in juxtaposed position together and in the path of said transmitted beam of laser light with said ends of said printer band located at said predetermined focal point of said transmitted beam of laser light to weld said juxtaposed ends of said printer bands together;

transporting said secured printer band along said fixed axis of said transmitted beam of laser light a predetermined distance to maintain said welded ends of said printer band in said path of said transmitted beam of laser light outside said focal point of said transmitted beam of laser light to anneal said welded ends of said printer band.

20. The method of claim 14 further including the step of:

translating said secured printer band in directions normal to said axis of said transmitted beam of laser light for welding and annealing said juxtaposed ends of said printer band when said juxtaposed ends of said printer band is greater in size than said focal point of said transmitted beam of laser light.

21. The method of claim 19 further including the step of:

translating said secured printer bands in directions normal to said axis of said transmitted beam of laser light for welding and annealing a plurality of said printer bands concurrently secured together.

22. Apparatus for sequentially welding together and annealing the ends of one or more printer bands comprising:

laser means for transmitting beam of laser light along a fixed axis, which beam of laser light is focused at a predetermined focal point;

means for securing the ends of one of said printer bands in juxtaposed position together and in the path of said transmitted beam of laser light with said ends of said printer band located at said predetermined focal point of said transmitted beam of laser light to weld said juxtaposed ends of said printer bands together, including:

worktable means for providing a substantially flat surface to support said printer bands including one or more indentations cut in the surface thereof, facing said transmitted beam of laser light, each of size and shape to match a corresponding printer band for retaining said corresponding printer band in a fixed position in directions normal to said axis of said transmitted beam of laser light, means connectable to said worktable for clamping said printer bands to said worktable;

means for transporting said securing means along said fixed axis of said transmitted beam of laser light a predetermined distance to maintain said welded ends of said printer band in said path of said transmitted beam of laser light outside said focal point of said transmitted beam of laser light to anneal said welded ends of said printer band;

means for translating said securing means in directions normal to said axis of said transmitted beam of laser light for welding and annealing said juxtaposed ends of said printer band when said juxtaposed ends of said printer band is greater in size than said focal point of said transmitted beam of laser light.

* * * * *